United States Patent [19]
Cavitt

[11] 3,956,180
[45] May 11, 1976

[54] HYDROCARBON SOLUBLE MOLYBDENUM CATALYSTS

[75] Inventor: Stanley Bruce Cavitt, Austin, Tex.

[73] Assignee: Texaco Development Corporation, Austin, Tex.

[22] Filed: Dec. 28, 1970

[21] Appl. No.: 102,227

[52] U.S. Cl. .................... 252/431 R; 260/348.5 V
[51] Int. Cl.$^2$ ........................................ B01J 31/12
[58] Field of Search ........... 252/431 R; 260/348.5 V

[56] References Cited
UNITED STATES PATENTS

| | | | |
|---|---|---|---|
| 2,795,552 | 6/1957 | Abbott et al. | 252/49.7 |
| 2,805,997 | 9/1957 | Benoit et al. | 252/42.7 |
| 3,259,638 | 7/1966 | Allison | 252/431 R |
| 3,285,942 | 11/1966 | Price et al. | 260/429 |
| 3,351,635 | 11/1967 | Kollar | 252/431 R |
| 3,629,222 | 12/1971 | Coover et al. | 252/431 R |

OTHER PUBLICATIONS

Cartan et al., "Electric Moments of the Simple Alkyl Orthovanadates," J. Phys. Chem. 64, pp. 1756–1758 (1960).

*Primary Examiner*—Patrick P. Garvin
*Attorney, Agent, or Firm*—Lee G. Meyer

[57] ABSTRACT

Hydrocarbon-soluble molybdenum catalysts are prepared by reacting an ammonia-containing molybdate with a hydroxy compound, for example, an organic primary or secondary alcohol, a glycol or a phenol. The hydrocarbon-soluble molybdenum solutions are useful as homogeneous oxidation catalysts, particularly for the oxidation of olefins to olefin oxides. Olefin oxides are useful in the manufacture of non-toxic antifreeze, urethane-grade polyols and many other applications. The catalysts of the invention may also be used as metal-plating solutions, lubricant additives, pigments, ammoxidation catalysts, printing inks, or solution components for organic laser devices. They may also be used as catalysts or co-catalysts for various polymerization processes, such as homopolymerization of isocyanates, isocyanate-polyol reactions, or olefin oxide polymerization reactions.

6 Claims, No Drawings

HYDROCARBON SOLUBLE MOLYBDENUM CATALYSTS

BACKGROUND OF THE INVENTION

1. Field of the Invention

The invention pertains to the chemical field and the synthesis and use of molybdenum-containing catalysts.

2. Description of the Prior Art

Giovanni A. Bonetti's and Rudolph Rosenthal's U.S. Pat. No. 3,480,563 (Nov. 25, 1969) discloses organic-soluble molybdenum compounds derived from a direct reaction between molybdic oxide and an alcohol. However, these catalysts cannot be prepared easily in high metal concentrations by their process. They teach molybdenum trioxide as the only preferred starting material. I have discovered that soluble molybdenum catalysts containing relatively high molybdenum concentrations are obtained using a molybdate starting material. Cartan, F., and Caughlan, C. N., J. Phys. Chem. 64, 1756 (1960) teaches the preparation of alkoxyvanadates from ammonium metavanadate and alcohols. J. A. Price's and R. F. Neblett's U.S. Pat. No. 3,285,942 (Nov. 15, 1966) describes an improved method for the preparation of glycol molybdate complexes for use as lubricant additives. Netherlands application No. 6,510,118 (Aug. 4, 1965) describes a direct oxidation process utilizing molybdenum compounds as catalysts.

SUMMARY OF THE INVENTION

The invention is a process for preparing hydrocarbon-soluble molybdenum catalysts by heating an ammonia-containing molybdate with a hydroxy compound, for example, an organic primary or secondary alcohol, a glycol or a phenol to a temperature which dissolves the basic molybdenum compound within a reasonable period of time. The catalyst can be preoxidized for better effectiveness as an epoxidation catalyst. The invention includes the catalysts prepared by this process and the use of the catalysts for the oxidation of olefins to olefin oxides.

DESCRIPTION OF THE PREFERRED EMBODIMENTS

The invention relates to the production of hydrocarbon-soluble molybdenum catalysts prepared by heating an ammonia-containing molybdate with a hydroxy compound, for example, organic primary or secondary alcohol or a glycol containing 3 to 30 carbon atoms or a phenol to a temperature which dissolves the basic molybdenum compound.

The following examples and table illustrate my invention in more detail but are not intended to limit the scope of the invention. Examples 1 – 8 illustrate the preparation of several catalysts of the invention. Example 9 illustrates the preparation of an olefin oxide using the catalysts of the invention.

EXAMPLE 1

Reaction of Ammonium Molybdate with Tridecyl Alcohol

To a 1-liter distilling flask equipped with a capillary air bleed and thermometer were added 10 g. of ammonium molybdate and 150 g. of tridecyl alcohol. The flask was attached to a 1 inch × 24 inch silvered, vacuum-jacketed column equipped with a reflux ratio controller. The mixture was refluxed under full pump vacuum (1–2 mm. Hg pressure with air bleed) for 1.5 hours, then about 40 to 50 ml. of tridecyl alcohol was taken overhead at a 1:1 reflux ratio. The pot temperature was about 135°–140°C. The pot residues, which were not homogeneous, were filtered through a thin pad of inorganic filter aid. There was recovered 65 g. of a homogeneous, very dark yellow solution which appeared to be stable in air and was soluble in acetone and in cyclohexane. The molybdenum content (by atomic absorption analysis) was 3.4 wt. %.

EXAMPLE 2

Reaction of Ammonium Molybdate with 2-Ethyl-1,3-Hexanediol

This experiment was similar to that of Example 1, except 15 g. of finely powdered ammonium molybdate and 150 g. of 2-ethyl-1,3-hexanediol were employed. There was recovered 94 g. of dark, yellow-green molybdenum solution which contained 6.3 wt. % of the metal.

EXAMPLE 3

Oxidation of an Ammonium Molybdate-Tridecyl Alcohol Reaction Product

This example illustrates preoxidation of the catalyst of my invention. To a 1000 ml., 3-necked distilling flask equipped with a magnetic stirring bar, oxygen sparger tube, condenser, and vent tube were added 10 g. of a molybdic acid-tridecyl alcohol product of Example 1 and 300 g. chlorobenzene. The mixture was refluxed at 130°–132°C. with continous oxygen flow (about 200–400 ml./min.) for 1 hour. During the reflux period, the solution color changed from dark yellow to green and finally to dark blue. No solid residues formed either during or after the oxygen treatment. This oxygen-treated material appeared to have better stability and solubility characteristics than the untreated sample.

EXAMPLE 4

Reaction of Ammonium Molybdate with $C_{11} - C_{14}$ Glycol

To a 500 ml. distilling flask equipped with a magnetic stirring bar, foam trap, and thermometer were added 100 g. of a $C_{11} - C_{14}$ vicinal glycol blend (prepared from $C_{11} - C_{14}$ olefin oxides), 10 g. of powdered ammonium molybdate, and 20 ml. of chlorobenzene. The mixture was heated under aspirator vacuum at 160°–170°C. for 1 hour, during which time some vapors were evolved and essentially all of the ammonium molybdate dissolved to give a very dark yellow solution. This solution was diluted with 100 ml. of chlorobenzene to prevent solidification of excess glycol, then filtered through inorganic filter aid to remove solid residues. There was recovered 223 g. of clear, dark yellow solution containing 2–3% molybdenum.

About 50 g. of the above solution was oxidized and worked up by a procedure similar to that described in Example 3 to give 73 g. of a clear, completely homogeneous, deep yellow solution containing 1.5% molybdenum.

EXAMPLE 5

Reaction of Ammonium Molybdate with Decyl Alcohol

This experiment was performed in a manner similar to that described in Example 4, except 20 g. of ammonium molybdate and 200 g. of decyl alcohol were heated at a temperature of 115°–120°C. for 1 hour, then at 130°–135°C. for an additional hour. The reflux temperature was controlled by an air bleed-regulated aspirator vacuum. After working up the product by the usual procedure, there was obtained 219 g. of dark yellow, homogeneous solution containing 3.6 wt. % molybdenum.

EXAMPLE 6

Reaction of Ammonium Molybdate with Isononyl Alcohol

To a 1000 ml. distilling flask equipped with a foam trap, magnetic stirring bar, and thermometer were added 20 g. of powdered ammonium molybdate and 220 g. isononyl alcohol. The mixture was heated under aspirator vacuum and the reflux temperature was adjusted to 140°–160°C. by use of an air bleed-regulated aspirator. After one hour reflux time, most of the salt had dissolved to give a very dark yellow solution. After cooling to room temperature, the solution was filtered through inorganic filter aid to remove solid residues and the filter pad was washed with a small amount of isononyl alcohol. There was recovered 277 g. of a dark brown, homogeneous solution containing 3.97 wt. % molybdenum. (Calculated value: 3.93 wt. %)

EXAMPLE 7

Oxidation of an Ammonium Molybdate-Isononyl Alcohol Reaction Product

This example illustrates preoxidation of the catalyst of my invention. A 100 g. sample of the catalyst prepared in Example 6 was added to a 500 ml. round bottom flask and placed on a very small rotary evaporator under full pump vacuum. The sample was concentrated at 70°–90°C. on a water bath until essentially all the excess alcohol was removed. The 17 g. of concentrate was then dissolved in 500 ml. of chlorobenzene, added to a 1000 ml. 3-necked flask, and treated with oxygen as described in Example 3. The deep-blue, homogeneous solution was then cooled and concentrated on a steam bath under aspirator vacuum to a final weight of 128 g. This solution contained 3.19 wt. % molybdenum. (Calculated value: 3.1 wt. %)

EXAMPLE 8

Reaction of Ammonium Molybdate with Tetrahydrofurfuryl Alcohol

To a 500 ml. 3-necked reaction flask equipped with a magnetic stirring bar, thermometer, and foam trap were added 10 g. of powdered ammonium molybdate and 200 g. of tetrahydrofurfuryl alcohol. The slurry was heated at reflux temperature for one hour (about 100° to 120°C.) under partial aspirator vacuum using an air bleed regulator. All of the solid had dissolved in less than 30 minutes time (with fast removal of water and lights) to give a clear, red-brown solution. Some alcohol was distilled out in order to assure complete water removal. The temperature was raised to 130°C. during a short, 5-minute period. The solution was then placed in a round bottom flask, attached to a rotary evaporator, and concentrated on a water bath (100°C.) at 50 mm Hg. pressure. The concentrated solution (very small volume) weighed 23 g.

The above concentrate was diluted with 500 ml. chlorobenzene and placed in a 1-liter, 3-necked reaction flask containing an oxygen sparging tube, vertical glass inspection tube with dropper bulb, condenser, gas vent tube, magnetic stirring bar, and thermometer. The flask was purged with oxygen and a flow rate of 200 – 400 ml./min. was established. The mixture was heated to reflux temperature (130°C.) and held for one hour. The solution color darkened somewhat during the oxidation period, but only traces of solid residues were formed. The chlorobenzene solution was placed on a steam bath and heated under aspirator vacuum to remove chlorobenzene. The dark, slightly turbid solution was filtered through Celite filter aid and the filter pad was washed with chlorobenzene. There was obtained 176 g. of clear, dark red-brown filtrate containing 3.01 wt. % molybdenum by atomic absorption analysis. The overall molybdenum conversion was 97%. Minor losses were encountered during workup.

The following table illustrates several other molybdenum catalysts prepared which are within the scope of my invention. The molybdenum analysis reported in the table is the molybdenum present in a concentrate after removal of excess alcohol. The concentrated catalyst or the catalyst in the original alcohol solution are both useful in the oxidation of olefins to olefin oxides.

Table

| Alcohol | Reaction Temp. °C | Time Min. | Mo converted to soluble form Wt. % | Color of Pre-Oxidized Product | Mo in concentrate Wt. % |
|---|---|---|---|---|---|
| N-Decanol | 120–130 | 240 | 80–90 | Blue | 19.3 |
| 2,6-Dimethyl-4-heptanol | 150, 135–140 | 120, 180 | 74 | Blue | 37.2 |
| 2,2-Dimethyl-1,pentanol | 150–155 | 120 | 44 | Blue | 26.3 |

The use of the molybdenum catalysts disclosed in this invention is illustrated by the following example, which describes the catalytic liquid-phase oxidation of the olefin propylene to propylene oxide. As shown in examples 3 and 7, the molybdenum catalysts useful in oxidation of olefins can be preoxidized in the presence or absence of alcohol used in the catalyst synthesis.

EXAMPLE 9

Oxidation of Propylene to Propylene Oxide Using a Molybdenum - Isononyl Alcohol Catalyst The apparatus used for this oxidation was a stirred, ceramic-lined, 500 ml. autoclave. Chlorobenzene solvent containing 28 ppm. molybdenum (as an ammonium molybdate - isononyl alcohol reaction product, oxidized) was premixed with oxygen and fed into the autoclave at two points: a connection, bottom center, where this feed was mixed with propylene, and a dip tube extending about halfway to the bottom of the autoclave. The autoclave was fitted with a cooling coil to provide close temperature control, and was equipped with a mechanical stirrer with three sets of propellers on the shaft. A product withdrawal tube at the top of the autoclave allowed the product to exit to a cooling coil and then through a back-pressure regulator to a gas-liquid separator where the off-gas was metered and sampled and the liquid product was retained for weighing and sampling. The solvent-filled reactor was heated to reaction temperature (250°C.) and propylene was fed to the reactor for 10–15 min. before the oxygen was turned on. After the initial exotherm, about ½ to 1 hour prerun, a steady state was achieved, the product was collected, and the off-gas was sampled. The feed rates for the reaction were as follows: chlorobenzene, 46.2 lbs./hr.; propylene, 8.32 lbs./hr.; oxygen, 564 g./hr. The holding time was 1.2 minutes. The yield of propylene oxide by chromatography, allowing for the heavy residues formed, was 57 mol % and the conversion based on propylene was 15 mol %. The residues/oxide wt. ratio was 0.11 and the oxide/acids wt. ratio was 12.5.

Effective amounts of catalyst for the oxidation of olefins to olefin oxides range from 5 to 1000 parts per million (ppm) based on the total feedstock. Preferred ranges are between 10 and 100 ppm.

Comparable results to those illustrated in the examples, supra, are obtained when other catalysts within the scope of the invention are prepared and used in the oxidation of olefins, for example, ethylene, propylene, butylene or isobutylene or higher olefins.

Any temperature and time combination can be used to prepare the catalysts of the invention which will result in dissolution of the basic molybdenum compound. The preferred conditions are temperatures about 100° to 200°C. and reaction times of about 1–4 hours.

Examples of the ammonia-containing molybdates are ammonia paramolybdate or "85% molybdic acid" which contains about 85% ammonium paramolybdate.

The hydroxy compounds useful in the synthesis of catalysts of the invention are, for example, primary or secondary alcohols or glycols containing 3 to 30 carbon atoms, or phenols. The alcohols may contain olefinic groups or saturated ether groups. The alcohols may be pure compounds or mixtures of isomers. Mixtures of isomers, particularly those of highly branched or iso alcohols, are usually preferred. The alcohols include primary and secondary linear, branched, alicyclic, aliphatic, and arylaliphatic alcohols, including those with unsaturated olefinic groups or cyclic and aliphatic ether groups. Further examples of hydroxy compounds useful in the synthesis of catalysts of the invention are 5-norbornene-2-methanol, 2,2,4-trimethyl-1,3-pentanediol, nonyl phenol, 3,5,5-trimethyl-1-hexanol, methoxyethanol, 1,3-propylene glycol and 1,2-propylene glycol. There are no required concentration ranges for the molybdates to hydroxys. However, the hydroxy concentration must be in excess of the molybdate.

The hydrocarbon-soluble molybdenum solutions of the invention are useful as homogeneous oxidation catalysts, particularly for the oxidation of olefins to olefin oxides. They are also of value as metal-plating solutions, lubricant additives, ammoxidation catalysts, printing inks, pigments, or solution components for organic laser devices. These molybdenum compounds may be used as catalysts or co-catalysts for various polymerization processes such as homopolymerization of isocyanates, isocyanate-polyol reactions or olefin oxide polymerization reactions. Olefin oxides are useful in the manufacture of non-toxic antifreeze, urethane-grade polyols and many other applications.

Having thus described my invention, I claim:

1. A process for preparing a hydrocarbon soluble molybdenum catalyst comprising the steps of: heating an ammonium molybdate with a hydroxy compound containing from 3–30 carbon atoms per molecule wherein said hydroxy compound is selected from the group consisting of organic hydrocarbon primary alcohols, and organic hydrocarbon secondary alcohols to a temperature which dissolves the ammonium molybdate, the hydroxy concentration of said hydroxy compound being in excess of the molybdate concentration of said ammonium molybdate; and, oxiding the ammonium molybdate-alcohol product formed, by refluxing said product in a solvent in the presence of molecular oxygen.

2. A process according to claim 1 wherein said hydroxy compound is tridecyl alcohol, decyl alcohol, isononyl alcohol, tetrahydrofurfuryl alcohol, or tetrahydropyran-2-methanol.

3. A process according to claim 2 wherein the alcohol is tetrahydrofurfuryl alcohol.

4. A hydrocarbon-soluble molybdenum catalyst prepared by reacting an ammonium molybdate (A) with a hydroxy compound (B) containing from 3 to 30 carbon atoms per molecule wherein the hydroxy compound is selected from the group consisting of organic hydrocarbon primary alcohol, and organic hydrocarbon secondary alcohol, at a temperature which dissolves the ammonium molybdate (A) and wherein the hydroxy concentration of (B) is in excess of the molybdate concentration of (A); and, oxiding the ammonium molybdate-alcohol product formed, by refluxing said product in a solvent in the presence of molecular oxygen.

5. A catalyst according to claim 4 wherein said hydroxy compound (B) is tridecyl alcohol, decyl alcohol, isononyl alcohol, tetrahydrofurfuryl alcohol, or tetrahydropyran-2-methanol.

6. A catalyst according to claim 5 wherein said hydroxy compound (B) is tetrahydrofurfuryl alcohol.

* * * * *